United States Patent [19]

Späni et al.

[11] Patent Number: 4,590,919
[45] Date of Patent: May 27, 1986

[54] COOKING VESSEL WITH COVER GUARD

[75] Inventors: Toni Späni, Oberengstringen; Rita Lichtenstein, Zurich, both of Switzerland

[73] Assignee: Lispa R. Lichtenstein, Zurich, Switzerland

[21] Appl. No.: 691,718

[22] Filed: Jan. 14, 1985

Related U.S. Application Data

[63] Continuation-in-part of Ser. No. 575,156, Jun. 30, 1984, abandoned.

[30] Foreign Application Priority Data

Feb. 4, 1983 [CH] Switzerland ............... 650/83

[51] Int. Cl.⁴ ............................................. A47J 27/00
[52] U.S. Cl. ................................. 126/382; 126/381; 220/369; 220/370
[58] Field of Search ............ 126/378, 382, 381, 389; 220/369, 370, 373, 374

[56] References Cited

U.S. PATENT DOCUMENTS

| 1,968,950 | 8/1934 | Maigret | 126/382 |
|---|---|---|---|
| 2,002,237 | 5/1935 | Roland | 220/369 |
| 2,498,534 | 2/1950 | Drum | 220/370 |
| 2,622,591 | 12/1952 | Bramberry | 126/381 |
| 2,636,636 | 4/1953 | Smith | 220/369 |
| 2,751,901 | 6/1956 | Livermore | 220/369 |
| 3,489,075 | 1/1970 | O'Reilly | 126/381 |
| 3,809,064 | 5/1974 | Ziegler | 126/381 |
| 4,000,830 | 1/1977 | French | 220/369 |

FOREIGN PATENT DOCUMENTS

| 385448 | 12/1964 | Switzerland . | |
| 14370 | of 1906 | United Kingdom | 220/369 |
| 25606 | of 1908 | United Kingdom | 220/369 |

Primary Examiner—Larry Jones
Attorney, Agent, or Firm—Sewall P. Bronstein; Robert M. Asher

[57] ABSTRACT

The cover guard includes an invertible hood consisting of a top section including an opening, of a side wall section and a skirt section, the latter consisting of a grooved section and a level section such that the cover guard may be placed on a cooking vessel such that the level section rests on the upper edge or rim, respectively, of the vessel. This design of the skirt section secures on the one hand a safe resting of the cover guard on the cooking vessel and on the other hand an impeccable dripping off of any material condensed on or having been splashed against the hood.

7 Claims, 3 Drawing Figures

COOKING VESSEL WITH COVER GUARD

This is a continuation-in-part of co-pending application Ser. No. 575,156 filed on Jan. 30, 1984, now abandoned.

BACKGROUND OF THE INVENTION

1. FIELD OF THE INVENTION

The present invention relates to an improved invertible cover guard for a cooking vessel, including an integrally shaped hood having a top section provided with an opening allowing access to the cooking vessel, including further a side wall section and a skirt section intended to be fitted over the rim of the cooking vessel.

2. DESCRIPTION OF THE PRIOR ART

An auxiliary implement used when frying or roasting in an open pan has been disclosed in the CH-PS No. 385,448, which auxiliary implement comprises an annular side wall section, a rim section projecting inwards and leaving an opening allowing a proper access to the goods being fried or cooked, respectively, which auxiliary implement comprises further a section projecting inwards allowing the placing thereof onto the rim of the cooking vessel.

This auxiliary implement has, however, the drawbacks that due to the provision of the inwards projecting section having merely a small resting surface no stable positioning of the implement can be arrived at and furthermore, during continued use a damaging of the rim of the cooking vessel used, specifically if such vessel is provided with a surface coating, is easily possible.

SUMMARY OF THE INVENTION

Hence, it is a general object of the present invention to provide a cover guard for a cooking vessel which may be stably seated upon a respective cooking vessel without giving rise to a possible damaging of the rim area of such cooking vessel.

A further object of the invention is to provide an improved cover guard for a cooking vessel including a skirt section comprising a thereto adjoining grooved section and comprising further a level section projecting laterally from said grooved section, which level section is intended to be placed upon the upper edge of the rim of the cooking vessel.

According to a preferred embodiment the grooved section is given a U-shaped cross-sectional shape such to secure a dripping off of, for instance, condensed or splashed matter at the inner surface of the cover guard.

A still further object of the invention is to provide a rib projecting from the outer edge of the level section, so that the cover guard may be inverted and stably seated on the cooking vessel. The inverted position provides greater access to food, such as bacon or chicken, being fried in the bottom of the vessel.

BRIEF DESCRIPTION OF THE DRAWINGS

The invention will be better understood and objects other than those set forth above will become apparent when consideration is given to the following detailed description thereof. Such description makes reference to the annexed drawings, in which.

DESCRIPTION OF THE PREFERRED EMBODIMENT

Figure 1:
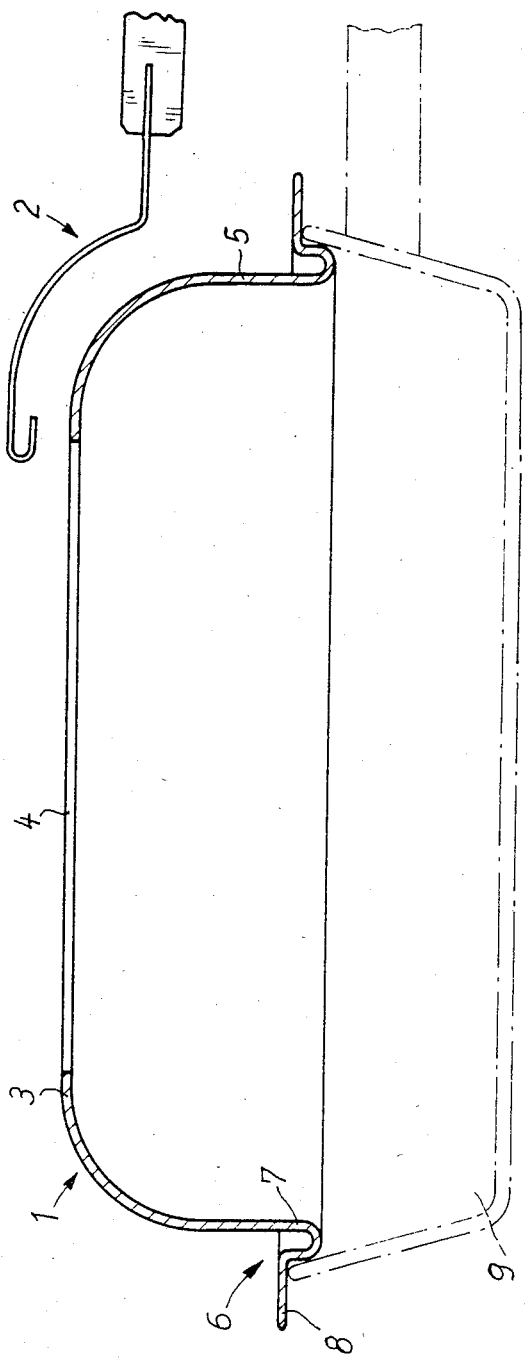
FIG. 1 is a sectional view through a first preferred embodiment of a cover guard constructed according to the present invention.

FIG. 1 illustrates a sectional view of a cover guard placed upon a cooking vessel designed in a dash-dotted manner. The cover guard comprises an integrally shaped hood 1 and a handle 2. The hood 1 consists of a top section 3 having an opening 4, of a side wall section 5 and a skirt section 6. The transition between top section 3 and side wall section 5 is a dome shaped section. The opening 4 located in the top section 3 is shaped such that a cooking vessel cover can be placed thereupon.

The skirt section 6 encompasses a grooved section 7 adjoining the side wall section 5 and a laterally projecting level section 8, which projects from the grooved section 7. The grooved section 7 is given a U-shaped cross-sectional shape and is additionally shaped such that one of its legs is formed integrally with the side wall section 5.

The shown embodiments of hood 1 are preferably made from a metal which has been given a surface treatment. According to further embodiments hood 1 can also consist of a plastics material. Still further embodiments foresee the hood 1 being made of a plastics material core and a metal covering surrounding the core completely.

According to the illustration of FIG. 1 the hood 1 is placed in such a manner onto the pot or pan 9, respectively, that the level section 8 of the skirt section 6 rests upon the upper edge or rim, respectively, of the pot and the grooved section 7 is located within the pan 9. This design secures that any condensed material or material which has splashed against the cover guard during the cooking drips off at the inner side of the cover.

Figure 2:
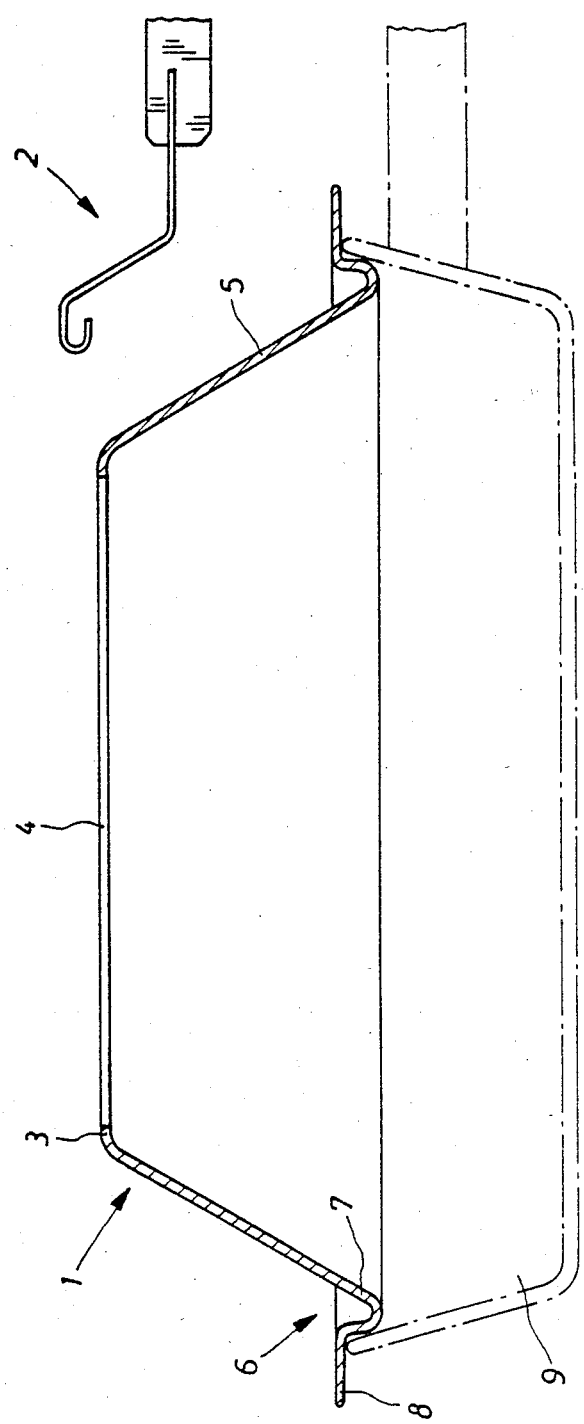
FIG. 2 is a view similar to the view of FIG. 1 of a further preferred embodiment of the invention and FIG. 3 is a sectional view of a further preferred embodiment of the invention in the inverted position.

The embodiment illustrated in FIG. 2 incorporates a side wall section 5 having a conical shape tapering towards the top section 3.

Figure 3:
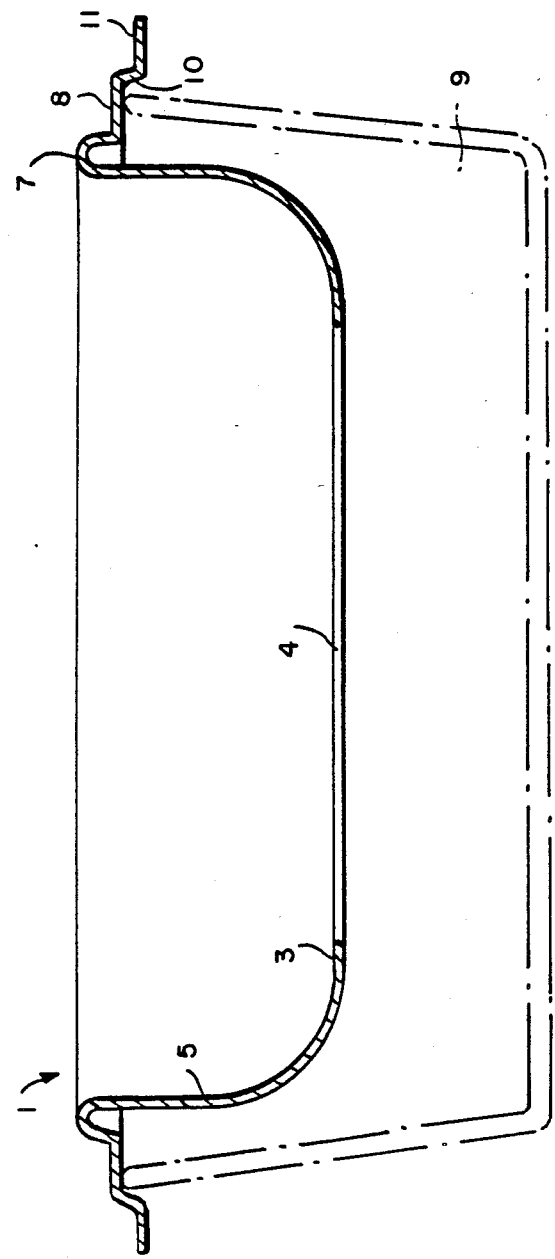

The embodiment in FIG. 3 illustrates the inverted positioning of a cover guard 1. In the inverted position, it is easier to reach through the opening 4 to manipulate food on the bottom of the cooking vessel. In the normal position, the vessel 9 may be filled with water for boiling macaroni or making soup. The embodiments of FIGS. 1 and 2 may be inverted, but nothing prevents the rim of the vessel from fitting into the groove 7 at one side, thereby tilting the cover guard 1.

The embodiment in FIG. 3 provides a rib 10 projecting from the outer edge of the level section 8 to keep the cover guard stably positioned upon the cooking vessel 9 when in the inverted position. The rib 10 interacts with the outside of the wall of the vessel 9 to keep the cover guard stably upon the vessel rim. The embodiment also includes a second level section 11 projecting laterally from the rib 10. The second level section 11 may be advantageously used in the normal upright position to provide an alternative section which may be seated on the rim of a vessel which is wider than that shown in FIGS. 1-3. In the upright position on a wide vessel, the embodiment of FIG. 3 is kept stable by the interaction of rib 10 with the inside wall of the vessel.

While there are shown and described present preferred embodiments of the invention, it is to be distinctly understood that the invention is not limited thereto, but may be otherwise variously embodied and practiced within the scope of the following claims.

Accordingly, we claim:

1. A cooking apparatus comprising: a cooking vessel having a bottom, a wall adjacent said bottom and a rim at the upper edge of said wall and a cover guard including:
   a hood having a sidewall with a bottom portion which rests near the rim of said cooking vessel when said cover guard is placed on said vessel, said sidewall supporting a top section provided with an opening to allow access to said cooking vessel;
   a grooved section formed by the bottom portion of said sidewall and a leg projecting upwards from the bottom portion of said sidewall; and
   a first level section integral with said leg and projecting laterally outward from said grooved section so that when said cover guard is placed on said vessel in an upright position said first level section is in resting engagement upon the rim of said cooking vessel and when said cover guard is placed on said vessel in an inverted position said first level section is in resting engagement upon the rim of said cooking vessel and the top section of said cover guard is supported above the bottom of said cooking vessel.

2. The improved cooking apparatus and cover guard of claim 1 in which said grooved section has a U-shaped cross-sectional shape.

3. The improved cooking apparatus and cover guard of claim 1 in which said sidewall has a conical shape tapering towards said top section.

4. The improved cooking apparatus and cover guard of claim 1 in which said opening in said top section is located to allow a placing of a cooking vessel cover thereupon.

5. The improved cooking apparatus and cover guard of claim 1 comprising a handle including a hook-like section intended for engaging said top section.

6. The improved cooking apparatus and cover guard of claim 1 further comprising a rib formed integrally with said first level section, said rib projecting up in the direction of said top section from the radially outward-most end of said first level section so that when said cover guard is in the inverted position said rib maintains the cover guard stably on said vessel by the interaction of said rib with the rim of said vessel.

7. The improved cooking apparatus and cover guard of claim 6 further comprising a second level section integrally formed with said rib and projecting laterally outward from said rib so that said cover guard can be used in the upright position on a wider cooking vessel for which said second level section is in resting engagement upon the rim of the wider cooking vessel and said rib maintains the cover guard stably on said vessel by the interaction of said rib with the rim of said wider vessel.

* * * * *